Aug. 20, 1929.  C. F. BRANNOCK  1,725,334
FOOT MEASURING INSTRUMENT
Filed Sept. 17, 1927
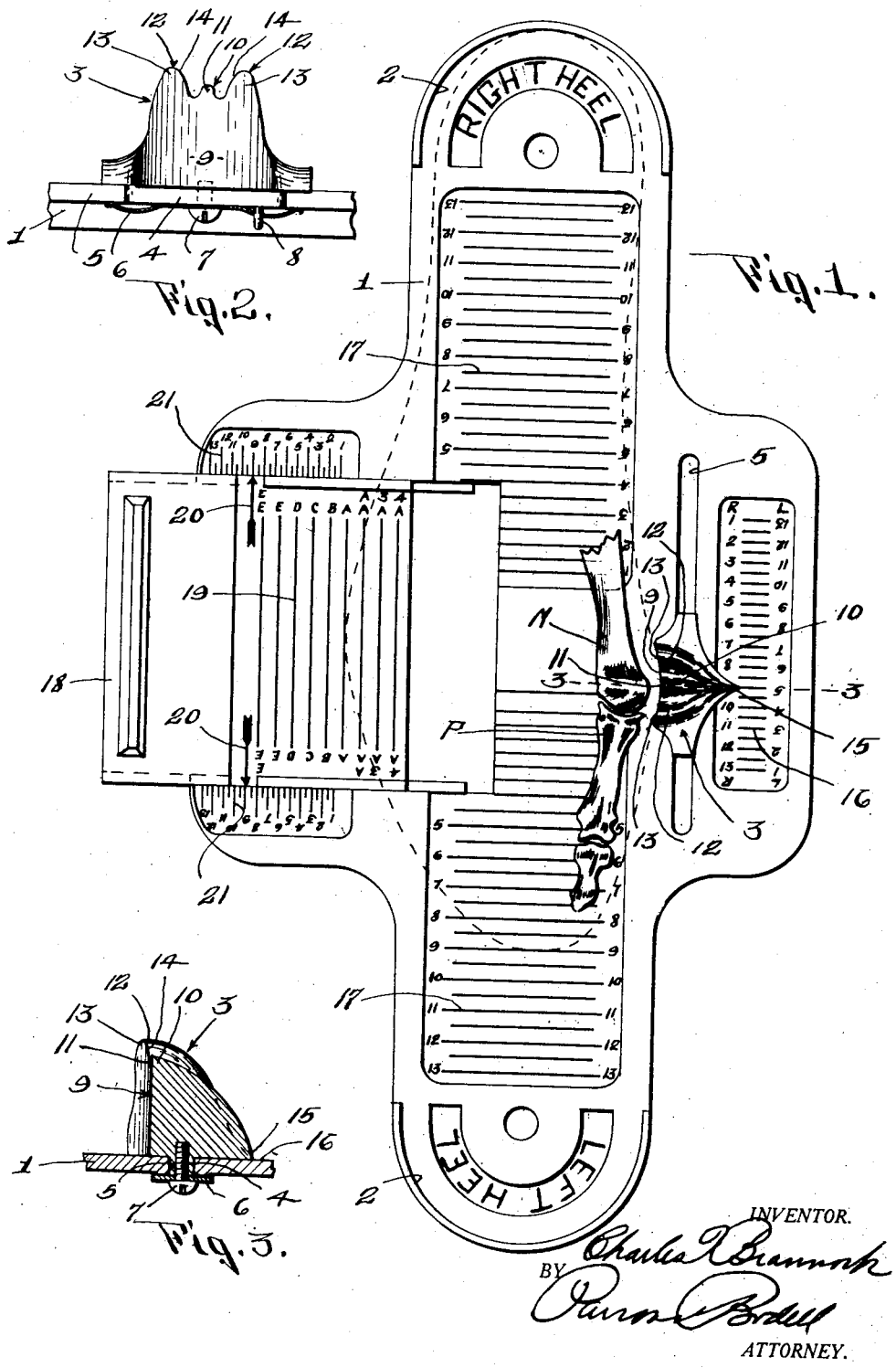
INVENTOR.
Charles F. Brannock
BY
ATTORNEY.

Patented Aug. 20, 1929.

1,725,334

UNITED STATES PATENT OFFICE.

CHARLES F. BRANNOCK, OF SYRACUSE, NEW YORK.

FOOT-MEASURING INSTRUMENT.

Application filed September 17, 1927. Serial No. 220,083.

This invention relates to foot measuring instruments for fitting shoes and has for its object an adjustable ball joint abutment having means by which it can be accurately set to find the exact center of the ball joint and a pointer movable along a scale for indicating the exact length of the foot from heel to ball joint.

The invention consists in the novel features and in the combinations and constructions hereinafter set forth and claimed.

In describing this invention, reference is had to the accompanying drawings in which like characters designate corresponding parts in all the views.

Figure 1 is a plan view of a foot measuring instrument embodying my invention.

Figure 2 is an inner face view of the ball joint abutment.

Figure 3 is a sectional view on line 3—3, Figure 1.

This instrument comprises generally a base having a heel abutment, a ball joint abutment adjustable along the base and formed with a pocket for receiving the ball joint of the foot and means designed to find the exact center of the ball joint, the ball joint abutment having an indicator movable along a length scale provided on the base to indicate the length of the shoe required.

I have here shown my invention as embodied in a single instrument for measuring both the right and the left feet.

1 designates the base which is a plate and 2 the heel abutment and as this instrument is designed to measure both right and left feet, there are two heel abutments arranged opposite to each other.

3 is the ball joint abutment slidable along the base plate, it being here shown as having a shank 4 extending through a guide slot 5 in the base and frictionally held in any adjusted position by a flat or leaf spring 6 sliding on the under face of the plate on opposite sides of the slot, the spring being secured to the abutment by a screw 7 and held from turning by a pin 8 extending from the abutment through a hole in the spring.

The ball joint abutment is formed with a concave pocket 9 for receiving the ball joint of the foot, and the means to aid in finding the exact center of the joint consists of an upward projection 10 arranged with its engaging face 11 in line with the deepest portion of the concave pocket 9 to engage with the bony structure of the foot at the end of the first metatarsal bone M and a second upward projection 12 higher from the former projection 10 and spaced apart therefrom with its engaging face 13 in line with or flush with the concave wall of the pocket, this projection 12 being located to come opposite the articulation point between the first proximal phalange bone P and the first metatarsal bone M. The edges of these projections converge at 14 toward each other and it will be understood that their engaging faces are in vertical alinement with the concave bottom of the pocket.

The ball joint abutment is provided with a suitable pointer 15 movable along a graduated scale 16 on the base showing the length of the shoe required when the ball joint abutment has been accurately fitted to the ball joint. As the instrument here shown is for measuring right and left feet, there are two of the higher projections 12 arranged on opposite sides of the shorter projection 10 and there are two scales 16 reading in opposite directions. The base is also provided with scales 17 for indicating the length of the right and left feet from heel to toe and also with an adjustable width finder 18, this being shown as a slide having width graduations 19 thereon and also pointers 20 which move along right and left foot scales 21 correlated with the length scales.

In operation, the shoe fitter ordinarily sets in front of the person to whom the shoe has been fitted with the heel abutment used farthest away from the shoe fitter. The foot is placed with the heel against the heel abutment and the ball joint abutment accurately fitted to the ball joint with the shorter projection 10 against the bony structure at the end of the first metatarsal bone. The shoe fitter uses his knowledge to accurately place the ball joint abutment with the middle projection 10 against the bony structure at the end of the metatarsal bone and with one of the higher projections 12 opposite the articulation point. The accurate placing of the abutment moves the pointer 15 along the finely graduated scale 16 and thus the length from heel to ball joint is accurately indicated. He then sets the width finder 18 by this measurement or by a measurement determined upon by comparing the length measurement from heel to ball joint and from heel to toe. Assuming that the pointer of the ball joint indicates the size numeral 8 on the scale 16 and also the length measurement from heel to toe is 8 along the scale 17, as it usually will be, then the operator shifts the width finder 18 until the pointer 20 thereon comes opposite the numeral 8 on the proper scale 21 and the width graduation 19 on the width finder in line with the outer edge of the foot, indicates the width of the shoe.

If the length measurements from heel to ball joint or from heel to toe are not exactly the same, the shoe fitter can strike an average by which to set the width finder. However, in shoe fitting, the accurate length to a fraction, from the heel to the ball joint is of greatest importance to accurately determine the size of the shoe both as to length and width and owing to the projections 10, 12, the length of the foot from heel to ball joint can be accurately found.

In fitting feet where the ball joint is small and the articulation point easily found, the shoe fitter places the projection 12 opposite to the articulation point and gives less attention to the projection 12 except that the foot must be placed so that the ball joint fits the pocket in the abutment.

When fitting feet where the ball joint is prominent and hence, the exact position of the articulation point difficult to find, the shoe fitter gives his attention primarily to locating the projection 10 at the end of the ball joint and makes his deduction as to the length of the shoe required from the location of the ball joint abutment as located when the projection 10 is accurately located.

In other words, when fitting some feet, the location of the projection 12 accurately at the articulation point is the primary determining factor and in fitting other feet, the location of the projection 10 at the center of the ball joint is the primary factor. In other cases the location of both projections 10 and 12 are of equal importance.

In any case, the location of the projections 10 and 12 are factors considered by the shoe fitter.

What I claim is:

1. A foot measuring device comprising a base having a heel abutment, a ball joint abutment adjustable along the base and having a pocket for receiving the ball joint and also having a projection provided with an engaging face in vertical line with the deepest part of the concave pocket for engaging the foot at the end of the first metatarsal bone and an upwardly extending projection of greater height than the former and spaced apart from and located at one side of the deepest part of the pocket, the latter projection being arranged to come opposite the articulation point between the first metatarsal and the first proximal phalange bones, the ball joint abutment having a pointer, and a scale on the base along which the pointer moves.

2. A foot measuring device comprising a base having opposing heel abutments for right and left feet, a ball joint abutment adjustable along the base and having a concave pocket for receiving the ball joint and a central upward projection having its engaging face in a vertical line with the deepest part of the bottom wall of the concave pocket for engaging the foot at the end of the first metatarsal bone and upwardly extending projections of greater height than the former and spaced apart from and located on opposite sides of the same having their engaging faces in line with the bottom wall of said pocket, the ball joint abutment having a pointer and a length indicating scale along which the pointer moves.

3. A foot measuring device comprising a base having a heel abutment, a ball joint abutment adjustable along the base and having a pocket for receiving the ball joint and a projection provided with an engaging face in vertical line with the deepest part of the concave pocket for engaging the foot at the end of the first metatarsal bone and a projection spaced apart from and of greater height than the former and located at one side of the deepest part of the pocket and arranged to come opposite the articulation point between the first metatarsal and the first proximal phalange bones, the ball joint abutment having a pointer and a scale on the base along which the pointer moves and a width indicator arranged to be set in correlation with the indication pointed out by the ball joint abutment.

4. A foot measuring device comprising a base having opposing heel abutments for right and left feet, a ball joint abutment adjustable along the base and having a concave pocket for receiving the ball joint and a central upward projection having its engaging face in a vertical line with the deepest part of the concave pocket for engaging the foot at the end of the first metatarsal bone, the ball joint abutment also having upwardly extending projections of greater height than the former and spaced apart from and located on opposite sides of the same with their engaging faces in line with the bottom wall of said pocket, the ball joint abutment having a pointer, a length indicating scale along which the pointer moves, and a width indicator arranged to be set in correlation with the indication pointed out by the ball joint abutment.

5. A foot measuring device comprising a base having a heel abutment, a ball joint abutment adjustable along the base and having a pocket for receiving the ball joint and also having an upward projection arranged at the center of the pocket with its engaging face flush with the bottom of the pocket for engaging the foot at the center of the ball joint of the foot at the end of the first metatarsal bone when the abutment is fitted to the ball joint, the abutment having a pointer and a scale on the base along which the pointer moves.

6. A foot measuring device comprising a base having a heel abutment, a ball joint abutment adjustable along the base and having a pocket for receiving the ball joint and also having an upward projection at one side of the deepest part of the pocket and formed with an engaging face flush with the wall of the pocket for engaging the foot in line with the articulation point between the first metatarsal and the first proximal phalange bones, the ball joint abutment having a pointer and a scale on the base along which the pointer moves.

In testimony whereof, I have hereunto signed my name, at Syracuse, in the county of Onondaga, and in the State of New York, this 15th day of Sept., 1927.

CHARLES F. BRANNOCK.